INVENTOR
AUGUST EBELING

Patented July 2, 1929.

1,719,107

UNITED STATES PATENT OFFICE.

AUGUST EBELING, OF CHARLOTTENBURG, BERLIN, GERMANY, ASSIGNOR TO SIEMENS & HALSKE AKTIENGESELLSCHAFT, OF SIEMENSSTADT, NEAR BERLIN, GERMANY, A GERMAN COMPANY.

METHOD OF AND MEANS FOR REDUCING CROSS TALK ON LOADED LINES.

Application filed August 23, 1927, Serial No. 214,874, and in Germany October 8, 1926.

This invention relates to a method of and means for obtaining small values of inductances and particularly for diminishing cross-talk on coil loaded lines.

The cross-talk transmission equivalent on Pupin lines, especially on phantom circuits, depends on the uniformity of the electrical properties of the cable on the one hand, and on the coils for inductively loading the line on the other hand. In a cable the interference from other speaking circuits is due chiefly to capacity irregularities, which may be eliminated in diverse ways, for example, by additional condensers.

In coil sets cross-talk is involved not only by capacity and resistance differences but also to a large extent by inductance unbalances of the windings. The capacity and resistance differences may be corrected to provide satisfactory transmission, while cross-talk may still exist from side circuits to phantom circuits and inversely from phantom to side circuits due to inductive unbalance. Efforts to balance the inductance of the coils by winding a turn on or off may not be sufficiently exact, however, to accurately and properly compensate for the inductive unbalance.

This invention aims at the elimination of these unbalances of inductance, the necessary balance being obtained with a small supplementary inductance in such a way that a portion of the wire, usually consisting of copper, is replaced by a conductor with increased inductance and approximately equal resistance. The conductor with increased inductance in this sense can be supplied by all Krarup types used for uniformly loaded telephone and telegraph cables, but in order to avoid the longitudinal component of the flux which is present, for instance, in single wound Krarup wires, Krarup wires may be used wound in opposite directions or a ferro-magnetic sleeve of thin concentric annular discs may be used as another means, magnetic material may be deposited electrolytically on the copper conductor.

After determining the difference in inductance, the conductor with increased inductance may be added in the coil winding in place of a few turns of copper wire or it may also be added externally by forming, for instance, the lead to the coil winding. As the self-inductance of the material used represents a certain magnitude per unit of length a very exact balance can be obtained quite easily for any discrepancies in the inductance of the coils.

The accompanying drawings illustrate one manner of practising the invention.

Figure 1:
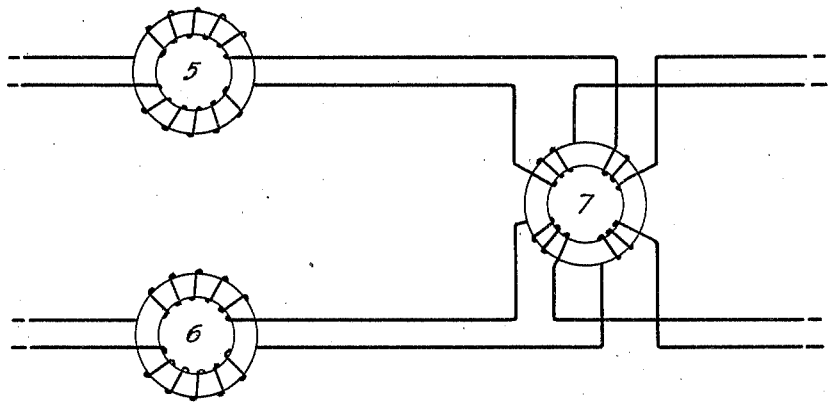
Fig. 1 shows schematically a loading coil set.

In Fig. 1, side circuit coils 5 and 6 load their respective physical circuits while phantom coil 7 loads the phantom circuit. Without an accurate inductive balance between the windings of the coils 5, 6 or 7, cross-talk will occur between the circuits.

Figure 2:
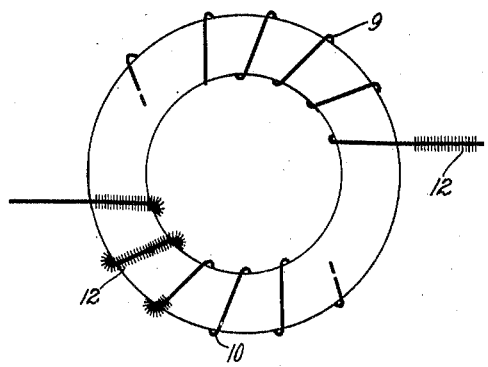
Fig. 2 shows schematically a loaded conductor applied to a coil.

Fig. 2 represents any one of the coils of Fig. 1 with conductors 9 and 10 representing portions of the windings of the coil. Two turns of conductor 10 have been continuously loaded by thin annular discs 12 to increase the inductance to the proper value. The elements 12 may have polygonal or elliptical form depending upon the shape desired. Conductor 9 has also been loaded by the discs but only the portion that leads to the coil and which may extend outside the coil casing.

Figure 3:
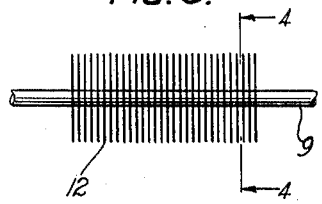
Fig. 3 shows a series of discs on a conductor.
Figure 4:
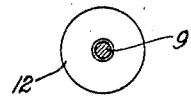
Fig. 4 is a face view of a disc.

Fig. 3 shows an enlargement of the loaded section of conductor 9 and Fig. 4 shows a section of Fig. 3 taken along line 4—4 and represents a face view of the discs.

This invention has been described as applied to one particular method of circuit loading but it is to be understood that it may be readily adapted to any system requiring precise inductance adjustments of coils.

What is claimed is:

1. A method of diminishing the cross-talk in coil loaded lines comprising first, determining the direction of inductance unbalance between the coils in said lines, and second, increasing the inductance of the coils with the lower inductance by replacing a portion of the conductor of said coils by a continuously loaded conductor having a high inductance per unit length.

2. A method of diminishing the cross-talk between two coil loaded lines comprising first, determining the direction and degree of unbalance between said coils of said lines, and second, increasing the inductance of the coils with the lower inductance to substantially equal that of the other of said coils by replacing a few turns of the coils by a conductor having higher inductance per unit length.

3. A method of diminishing the cross-talk between two coil loaded lines comprising first, determining the direction and the degree of unbalance between said coils of said lines, and second, increasing the inductance of the coils with the lower inductance to substantially equal that of the others of said coils by replacing a portion of the conductors leading to said coils with the lower inductance by a conductor having higher inductance per unit length.

4. In a transmission system, a plurality of lines between which cross-talk occurs, loading coils for said lines between which inductance unbalance occurs causing said cross-talk, said coils comprising a core with windings thereon, and a continuously loaded conductor having a higher inductance per unit length than the conductor of said coils, said loaded conductor replacing several turns of the conductor of said coils having a lower inductance than other of said coils providing all of said coils with substantially the same inductance and diminishing cross-talk between said lines.

5. A transmission system according to claim 4 in which said continuously loaded conductor replacing said coil conductor has a resistance to equal that of the replaced coil conductor when said coils are inductively balanced.

6. An inductance coil, the inductance of which is to be varied, having a core and a winding thereon, and a continuously loaded conductor having a higher inductance per unit length than the conductor of said winding, said loaded conductor forming a portion of said winding to increase the inductance thereof to a predetermined value.

In witness whereof, I hereunto subscribe my name this 4th day of August, A. D. 1927.

AUGUST EBELING.